US012005558B2

(12) United States Patent
Koskimaki et al.

(10) Patent No.: US 12,005,558 B2
(45) Date of Patent: Jun. 11, 2024

(54) ROCK DRILLING ARRANGEMENT AND MACHINE

(71) Applicant: SANDVIK MINING AND CONSTRUCTION OY, Tampere (FI)

(72) Inventors: Antti Koskimaki, Tampere (FI); Mikko Hamalainen, Tampere (FI); Matti Viinikka, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 280 days.

(21) Appl. No.: 17/436,732

(22) PCT Filed: Mar. 16, 2020

(86) PCT No.: PCT/EP2020/057161
§ 371 (c)(1),
(2) Date: Sep. 7, 2021

(87) PCT Pub. No.: WO2020/183031
PCT Pub. Date: Sep. 17, 2020

(65) Prior Publication Data

US 2022/0176535 A1 Jun. 9, 2022

(30) Foreign Application Priority Data

Mar. 14, 2019 (EP) .................................... 19162773

(51) Int. Cl.

| | |
|---|---|
| ***B25D 17/28*** | (2006.01) |
| ***B25D 9/14*** | (2006.01) |
| ***E21B 4/14*** | (2006.01) |

(52) U.S. Cl.
CPC ............ *B25D 17/28* (2013.01); *B25D 9/145* (2013.01); *E21B 4/14* (2013.01); *B25D 2250/051* (2013.01)

(58) Field of Classification Search
CPC .. B25D 17/28; B25D 9/145; B25D 2250/051; E21B 4/14; E21B 7/025
See application file for complete search history.

(56) References Cited

U.S. PATENT DOCUMENTS 3,470,970 A 10/1969 Mahy et al.
3,741,072 A 6/1973 Romell et al.
(Continued)

FOREIGN PATENT DOCUMENTS

WO 2010058073 A1 5/2010
WO 2016148575 A1 9/2016

*Primary Examiner* — Carib A Oquendo
(74) *Attorney, Agent, or Firm* — Corinne R. Gorski

(57) ABSTRACT

A rock drilling arrangement includes an impact device having a frame, pressure chambers in the frame, and a piston arranged in the impact device. The arrangement further includes a rear mounting arrangement for attaching the impact device to a carriage, a front mounting arrangement for attaching the impact device to a machine component, at least one fore pressure accumulator arranged on a front side of the rear mounting arrangement in an axial direction of the piston, and at least one rear pressure accumulator arranged on a back side of the rear mounting arrangement. The fore pressure accumulator and the rear pressure accumulator are connected to one of the pressure chambers and arranged to absorb pressure fluctuations in the pressure chambers.

12 Claims, 2 Drawing Sheets

(56) References Cited

U.S. PATENT DOCUMENTS

| | | | | |
|---|---|---|---|---|
| 7,654,337 | B2 * | 2/2010 | Noel | F15B 11/165<br>173/4 |
| 2002/0084110 | A1 * | 7/2002 | Heinonen | E21B 6/04<br>175/170 |
| 2015/0053076 | A1 | 2/2015 | Lundgren | |
| 2016/0001432 | A1 | 1/2016 | Kela et al. | |

* cited by examiner

ROCK DRILLING ARRANGEMENT AND MACHINE

RELATED APPLICATION DATA

This application is a § 371 National Stage Application of PCT International Application No. PCT/EP2020/057161 filed Mar. 16, 2020 claiming priority to EP 19162773.6 filed Mar. 14, 2019.

BACKGROUND

The invention relates to a rock drilling arrangement.

The invention further relates to a rock drilling machine.

Rock drilling machines comprise an impact device that provides impact pulses to a tool for drilling material being operated. The impact device comprises a reciprocating piston that moves towards an impact direction and a return direction. The impact device comprises a rear pressure chamber and a front pressure chamber. In order to move the piston into the impact direction, a high pressure is provided into the rear pressure chamber. For moving the percussion piston back, a low pressure is provided into the rear pressure chamber, whereby the percussion piston moves back by an effect of a high pressure remaining constantly in the front pressure chamber. However, the movement of the piston may also be realized some other way, too.

Due to a continuous variation of the pressure of pressure medium in pressure chambers, cavitation may occur in the pressure chambers. This may lead to deterioration of the impact device. In order to decrease risk to cavitation, pressure accumulators are known to connect to the pressure chambers.

Use of long piston in impact device is advantageous when drilling holes having large diameter, because the long piston provides a better impact dynamics than a piston having regular dimensions. The long piston is clearly longer than a regular piston.

A problem with the long piston impact devices is that due to their dimensions, they require much more space compared to regular impact devices.

BRIEF DESCRIPTION

Viewed from a first aspect, there can be provided a rock drilling arrangement, comprising an impact device comprising a frame, pressure chambers in the frame, a piston arranged in the impact device, a rear mounting arrangement for attaching the impact device to a carriage, a front mounting arrangement for attaching the impact device to a machine component, at least one fore pressure accumulator arranged on front side of the rear mounting arrangement in an axial direction of the piston, and at least one rear pressure accumulator arranged on back side of the rear mounting arrangement, the fore pressure accumulator and the rear pressure accumulator being connected to one of the pressure chambers and arranged to absorb pressure fluctuations in said pressure chambers.

Thereby a rock drilling arrangement fitting in commonly used drilling machines may be achieved. Furthermore, a rock drilling arrangement having high capacity of pressure accumulators and thus ability to absorb pressure vibrations may be achieved.

Viewed from a second aspect, there can be provided a rock drilling machine comprising the drilling arrangement described above.

The arrangement and the method are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the arrangement comprises at least two fore pressure accumulators. An advantage is that the accumulators are close to the front pressure chamber.

In one embodiment, the arrangement comprises four fore pressure accumulators. An advantage is that total volume of the pressure accumulators connected to pressure chambers arranged in the frame may be increased.

In one embodiment, the arrangement comprises at least two rear pressure accumulators. An advantage is that it is possible to arrange the accumulators close to a rear pressure chamber of the piston.

In one embodiment, at least one of the fore pressure accumulator(s) is a high pressure (HP) accumulator, the pre-charge pressure of which is in range of 50-150 bar. An advantage is that high pressure for providing an effective impact movement of the piston may be maintained in the front pressure chamber. In an embodiment, the pressure range is 50-100 bar. An advantage is that life-time of the components of the high pressure (HP) accumulator, such as an elastic diaphragm, may be extended.

In one embodiment, each of the fore pressure accumulator (s) is a high pressure (HP) accumulator. An advantage is that location of the HP accumulators may be optimized in relation to the piston.

In one embodiment, at least one of the rear pressure accumulator(s) is a low pressure (LP) accumulator, the pre-charge pressure of which is in range of 1-5 bar. An advantage is that the LP accumulators are close to the rear pressure chamber of the piston and may decrease risk to cavitation therein. In an embodiment, the pressure is 2-4 bar that is especially matching with typical tank pressure used with impact devices.

In one embodiment, each of the rear pressure accumulator (s) is a low pressure (LP) accumulator. An advantage is that risk to cavitation may be decreased effectively.

In one embodiment, the pressure accumulator is arranged on a side of the frame. An advantage is that the accumulator does not obstruct attachment of the impact device in the drilling arrangement.

In one embodiment, at least one of the pressure accumulators is arranged on a top of the frame. An advantage is that number and capacity of the pressure accumulators may be increased.

In one embodiment, the arrangement comprises two low pressure (LP) accumulators arranged at different positions in the axial direction X of the piston. An advantage is that the positions of the LP accumulators may be optimized in relation to the pressure chambers of the impact device.

In one embodiment, all the pressure accumulators are of same size. An advantage is that at least some of the parts of the accumulators may be identical, thus simplifying the service of the impact device.

In one embodiment, the rear mounting arrangement is aligned perpendicular in relation to the axial direction. An advantage is that the impact device is simple to attach to carriages commonly used in rock drilling machines.

In one embodiment, the rear mounting arrangement is aligned obliquely in relation to the axial direction. An advantage is that the position of the rear mounting makes it possible to optimize locations of the pressure accumulators.

In one embodiment, the piston is a long piston. An advantage is that it may provide better impact dynamics especially in making large-diameter holes.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
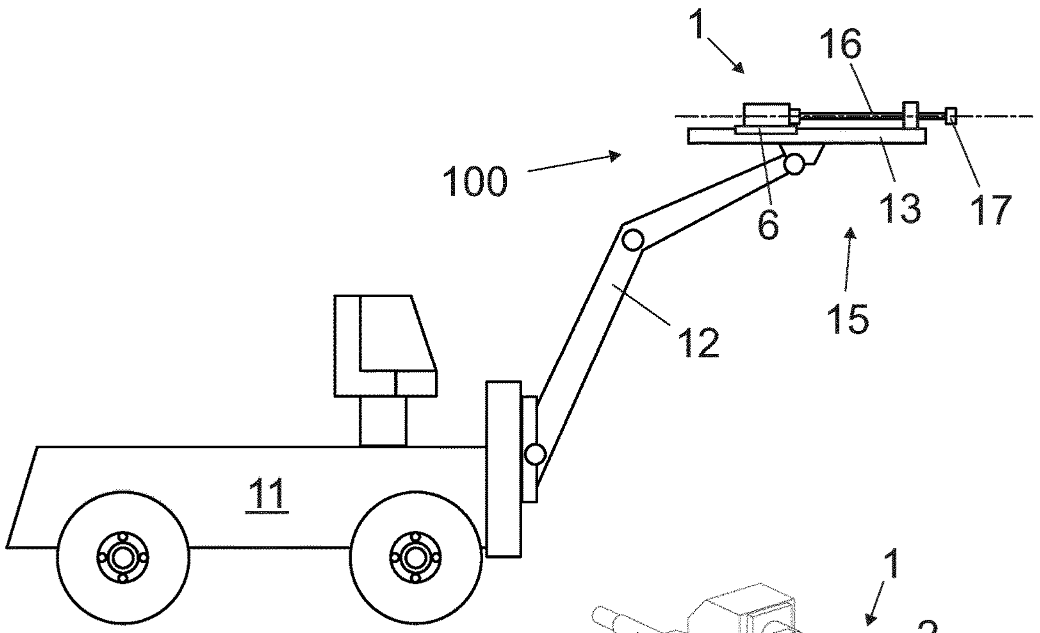
FIG. 1 is a schematic side view of a drilling machine.

FIG. 1 is a schematic side view of a drilling machine that comprises a rock drilling arrangement 100. The rock drilling arrangement 100 is connected by means of a boom 12 to a movable carrier 11. However, the rock drilling arrangement 100 may be arranged to the carrier 11 some another way, too.

The shown movable carrier 11 moves on wheels. In another embodiments, the carrier 11 moves e.g. on tracks.

The rock drilling arrangement 100 is attached to a carriage 6 that is arranged in a feed beam 13. The carriage 6 and the rock drilling arrangement 100 therewith may be moved on the feed beam 13 by means of a feed device (not shown).

The rock drilling arrangement 100 comprises a shank 14 (shown in FIGS. 2*a*, 2*b*) at a front end thereof for connecting a tool 15. The tool 15 may comprise one or more drill rods 16 and a drill bit 17 arranged at a distal end of the tool 15.

The rock drilling arrangement 100 may further comprise a rotating device (not shown) for rotating the shank 14 and the tool 15.

The rock drilling arrangement 100 comprises an impact device 1 that is arranged to generate impact pulses to the tool 15. The details of the impact device are described later in this description.

At a drilling site, one or more drill holes are drilled with the rock drilling unit 100. The drill holes may be drilled in a horizontal direction, as shown in FIG. 1, or in a vertical direction, or in any direction between the horizontal direction and the vertical direction. The disclosed solution is known as top-hammer drilling.

Figure 2A:
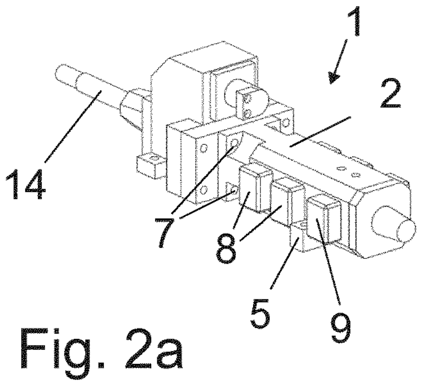
FIG. 2*a* is a schematic perspective view of a detail of an arrangement.
Figure 2B:
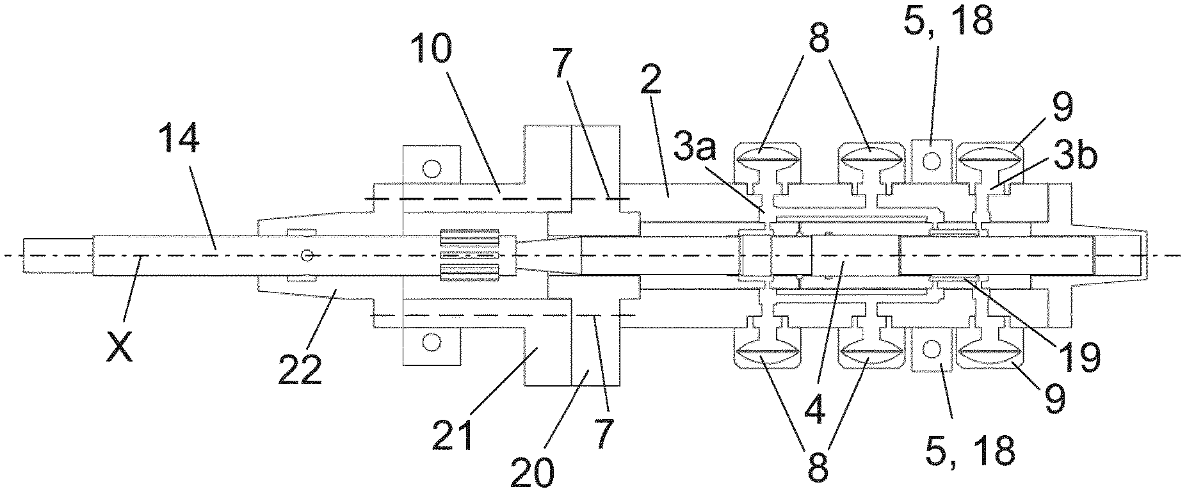
FIG. 2*b* is a schematic side view of a detail of an arrangement in partial cross-section.

FIG. 2*a* is a schematic perspective view and FIG. 2*b* is a schematic side view of a detail of a rock drilling arrangement in partial cross-section.

The rock drilling arrangement 100 has an impact device 1 comprising a frame 2, pressure chambers 3*a*, 3*b* in the frame 2, and a reciprocating piston 4 arranged in the impact device 1. The piston may be arranged to move to and fro in the frame 2 in axial direction X of the piston during a work cycle of the impact device 1. Said movement of the piston 4 is energized by pressurized pressure medium, typically hydraulic fluid, directed to the pressure chambers 3*a*, 3*b* of the frame and acting on working pressure surfaces of the piston 4. In the embodiment shown in FIG. 2*b*, a distributor 19 controls access of fluid in the pressure chambers such that a suitable force moving the piston is caused between pressure chambers of the piston.

In an embodiment, the piston 4 used is clearly longer than regular piston. It is to be noted, however, that the invention may also be applied to impact devices comprising a piston having a regular length.

A rear mounting arrangement 5 is arranged for attachment the frame 2 to the carriage 6. The rear mounting arrangement 5 shown in Figures comprises two fastening lugs 18 having a through hole as a mounting hole and arranged perpendicular in relation to the axial direction.

A fastening device, such as screw or bolt, may be fitted in the mounting hole. The mounting hole may be blank or comprise thread(s). In an embodiment, the rear mounting arrangement 5 is without any attachment means, but just comprises a contact surface that is arranged to take at least part of the weight of the impact device 1 and passing said weight to an underlying structure of the rock drilling arrangement 100, for instance to the carriage 6.

In another embodiment, the rear mounting arrangement 5 is realized without lugs or similar features but comprises a collar element that extends over the frame 2 and attaches the impact device 1 to e.g. the carriage 6.

Additionally, the impact device 1 may comprise at least one front mounting arrangement 7 for attaching the impact device 1 to a machine component 10. In the embodiment shown in FIGS. 2*a*, 2*b*, said machine component 10 is a spacer element 20 that is arranged between the impact device 1 and a gear box 21. The front mounting arrangement 7 comprises mounting holes that corresponds to mounting holes in said spacer element 20. The embodiment shown in FIGS. 2*a*, 2*b* comprises also a flushing unit 22 attached to the gear box 21.

In an embodiment, the machine component 10 is a gear box.

In an embodiment, the machine component 10 is a flushing unit.

In still another embodiment, the machine component 10 is the same carriage 6 to which the rear mounting arrangement 5 is attached.

According to an aspect, the impact device 1 comprises at least one fore pressure accumulator 8 arranged on front side of the rear mounting arrangement 5 in an axial direction X of the piston, and at least one rear pressure accumulator 9 arranged on back side of the rear mounting arrangement 5. The fore and the rear pressure accumulators 8, 9 are connected to one of the pressure chambers 3*a*, 3*b* of the frame.

The “front side of the rear mounting arrangement” means in this description parts or sections of the impact device lying between the rear mounting arrangement and the tool 15.

The “back side of the rear mounting arrangement” means in this description parts or sections of the impact device not lying between the rear mounting arrangement and the tool 15.

In the embodiment shown in FIG. 2, there are four fore pressure accumulators 8 and two rear pressure accumulators 9 in the impact device 1.

Placing some of the accumulators 8, 9 on back side of the rear mounting arrangement 5 makes it possible to select the location of the rear mounting arrangement 5 so that even an impact device 1 equipped with a long piston may be attached to a carriage dimensioned for drilling machines dimensioned for impact devices having a regular piston.

The pressure accumulator 8, 9 is practically pressure storage reservoir in which hydraulic fluid is held under pressure that is applied by an external source. In the shown embodiment, the external source is a compressed gas. The gas may be e.g. nitrogen gas.

In this embodiment, the pressure accumulator comprises a cylinder with two chambers that are separated by an elastic diaphragm, a totally enclosed bladder, or a floating piston. One of the chambers contains hydraulic fluid and is connected to one of the pressure chambers 3*a*, 3*b* of the frame. The other chamber of the pressure accumulator contains the gas under pressure that provides the compressive force on the hydraulic fluid. As the volume of the compressed gas changes, the pressure of the gas and the pressure on the hydraulic fluid changes inversely.

It is to be noted that in some another embodiments, the external source may be created instead of gas by e.g. a spring.

The pressure accumulators 8, 9 enable the hydraulic system of the impact device 1 to respond more quickly to a temporary demand of fluid, and to smooth out pulsations. It is a type of energy storage device. Additionally, especially the low pressure accumulators may reduce risks to cavitation in those pressure chambers of the frame and/or pressure chambers of the piston in which it is connected to.

The pressure accumulators 8, 9 are arranged on two sides of the frame 2 of the impact device such that the accumulators on a first side are face to face or opposite to the accumulators on a second side of the frame 2, i.e. they are in same position in the axial direction X of the piston. However, this arrangement is not compulsory one.

In the embodiment shown in FIG. 2, all the fore pressure accumulators 8 are a high pressure (HP) accumulators, the pre-charge pressure of which may be selected in range of 50-150 bar, preferably 50-100 bar. Multiple HP accumulators may reduce pressure-pulses of a pressure hoses connected to the impact device 1.

Additionally, all the rear pressure accumulators 9 are low pressure (LP) accumulators. The pre-charge pressure of the low pressure accumulator may be selected in range of 1-5 bar, preferably 2-4 bar.

It is to be noted, however, that LP and HP accumulators may be organized differently in relation to the rear mounting arrangement 5.

In an embodiment, there are both LP and HP accumulators in the fore pressure accumulators 8. Also the rear pressure accumulators 9 may comprise both LP and HP accumulators. Thus there are short distance from at least one LP and one HP accumulators to the pressure chambers 3*a*, 3*b*.

In an embodiment, two LP accumulators are attached at least substantially opposite positions in the frame 2.

In an embodiment, two HP accumulators are attached at least substantially opposite positions in the frame 2.

In an embodiment, a LP accumulator is attached at least substantially opposite position with a HP accumulator.

FIGS. 3*a*-3*d* are schematic side views of details of embodiments.

Figure 3A:
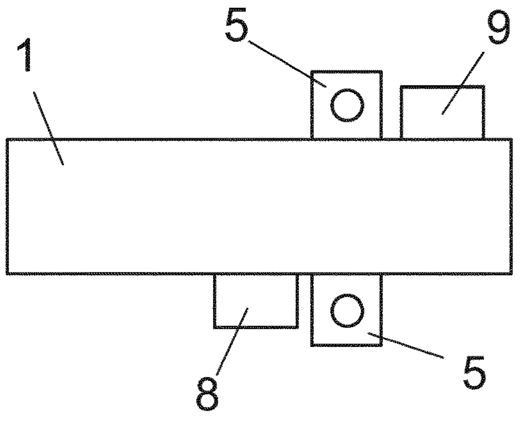
FIGS. 3*a*-3*d* are schematic side views of details of embodiments.

In FIG. 3*a* it is shown an embodiment that comprises just one fore pressure accumulator 8 and one rear pressure accumulator 9. In some aspects, this may be the simplest embodiment of the invention. In an embodiment, the fore pressure accumulator 8 is a HP accumulator connected to the front pressure chamber of the frame 2, whereas the rear pressure accumulator 9 is a LP accumulator connected to the rear pressure chamber of the frame. It is to be noted, that the fore pressure accumulator 8 and the rear pressure accumulator 9 may be arranged on the same side of the frame 2. Furthermore, it is possible to arrange at least one of the accumulators on top of the frame 2, i.e. opposite position in relation to the carriage.

Figure 3B:
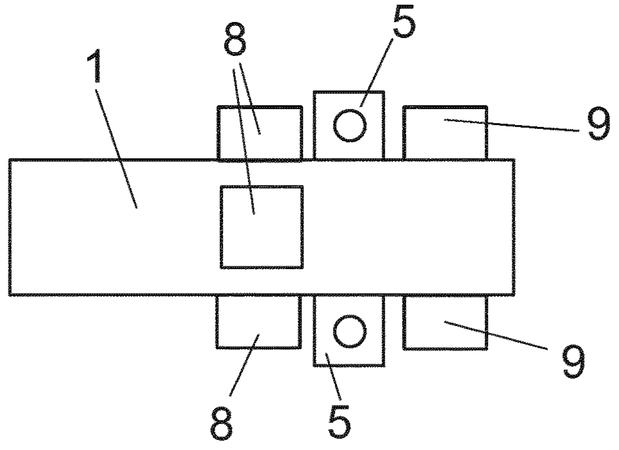

FIG. 3*b* is showing an embodiment comprising three fore pressure accumulators 8 and two rear pressure accumulators 9. In an embodiment, the fore pressure accumulators 8 are HP accumulators both fore accumulators being connected to the front pressure chamber 3*a* of the frame 2. The rear pressure accumulators 9 are LP accumulators and connected to the rear pressure chamber 3*b* of the frame.

In some embodiments of the invention, at least one of the fore and rear pressure accumulators 8, 9 is arranged on a top of the frame 2. FIG. 3*b* is showing an embodiment where one of the fore pressure accumulators 8 is arranged on top of the frame 2.

Figure 3C:
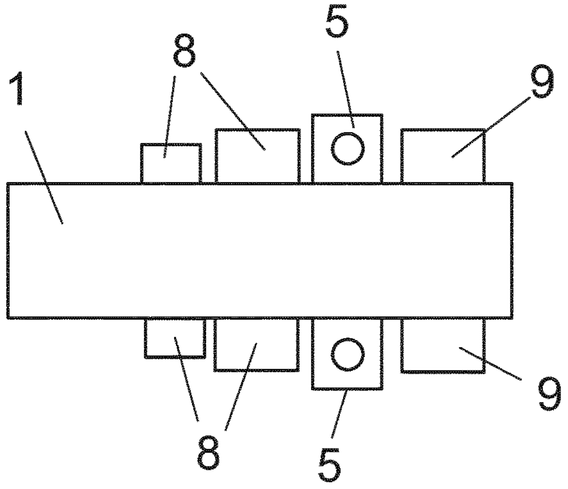

In an embodiment, the impact device comprises pressure accumulators having at least two sizes. FIG. 3*c* is showing an example of this embodiment, which comprises four fore pressure accumulators 8, including two smaller accumulators and two larger accumulators. By selecting the size of the accumulators it is possible to optimize performance of the impact device 1 for working operations to be executed.

Figure 3D:
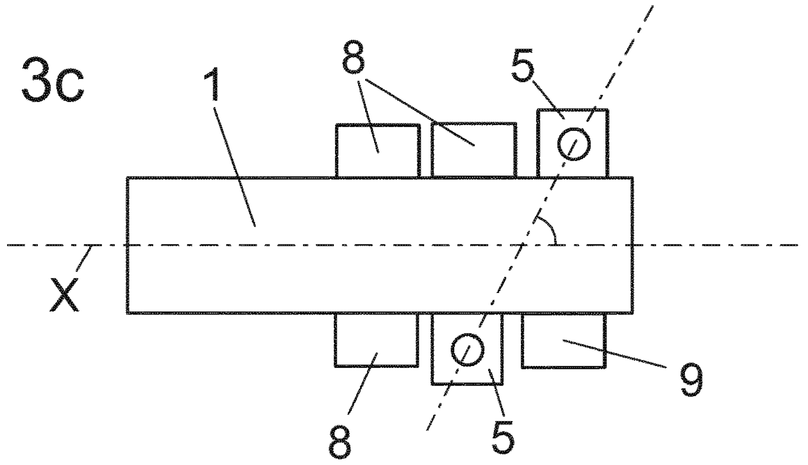

FIG. 3*d* is showing an example of embodiments wherein the rear mounting arrangement 5 is aligned obliquely in relation to the axial direction X.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 impact device
2 frame
3*a, b* pressure chamber
4 piston
5 rear mounting arrangement
6 carriage
7 front mounting arrangement
8 fore pressure accumulator
9 rear pressure accumulator
10 machine component
11 carrier
12 boom
13 feed beam
14 shank
15 tool
16 drill rod
17 drill bit
18 fastening lug
19 distributor
20 spacer element
21 gear box
22 flushing unit

100 rock drilling arrangement

X axial direction

The invention claimed is:

1. A rock drilling arrangement comprising:

an impact device including a frame, a plurality of pressure chambers in the frame, and a piston arranged in the impact device;

a rear mounting arrangement arranged for attaching the impact device to a carriage, the rear mounting arrangement having a front side and a back side and including two fastening lugs having a through hole as a mounting hole and arranged perpendicular in relation to an axial direction of the piston;

a front mounting arrangement arranged for attaching the impact device to a machine component;

at least one fore pressure accumulator arranged on the front side of the rear mounting arrangement in the axial direction of the piston; and at least one rear pressure accumulator arranged on back side of the rear mounting arrangement, the at least one fore pressure accumulator and the at least one rear pressure accumulator being connected to one of the plurality of pressure chambers and arranged to absorb pressure fluctuations in the plurality of pressure chambers.

2. The arrangement as claimed in claim 1, wherein the at least one fore pressure accumulator comprises at least two fore pressure accumulators.

3. The arrangement as claimed in claim 1, wherein the at least one fore pressure accumulator comprises four fore pressure accumulators.

4. The arrangement as claimed in claim 1, wherein the at least one rear pressure accumulator comprises at least two rear pressure accumulators.

5. The arrangement as claimed in claim 1, wherein the at least one fore accumulator comprises a plurality of fore pressure accumulators, at least one of the fore pressure accumulators being a high pressure accumulator having a pre-charge pressure in the range of 50-150 bar.

6. The arrangement as claimed in claim 5, wherein each of the plurality of fore pressure accumulators is a high pressure accumulator.

7. The arrangement as claimed in claim 1, wherein the at least one rear accumulator comprises a plurality of rear pressure accumulators, at least one of the plurality of rear pressure accumulators is a low pressure having a pre-charge pressure in the range of 1-5 bar.

8. The arrangement as claimed in claim 7, wherein each of the plurality of rear pressure accumulators is a low pressure accumulator.

9. The arrangement as claimed in claim 1, wherein the at least one fore and at least one rear pressure accumulator is arranged on a side of the frame.

10. The arrangement as claimed in claim 1, wherein at least one of the at least one fore pressure accumulator and the at least one rear pressure accumulator is arranged on a top of the frame.

11. The arrangement as claimed in claim 1, wherein the at least one fore accumulator and the at least one rear accumulator comprise two low pressure accumulators arranged at different positions in the axial direction of the piston.

12. A rock drilling machine comprising a drilling arrangement according to claim 1.

* * * * *